R. D. MORTON.
RUNNING GEAR FOR VEHICLES.
APPLICATION FILED DEC. 23, 1919.
1,375,311.
Patented Apr. 19, 1921.
3 SHEETS—SHEET 3.
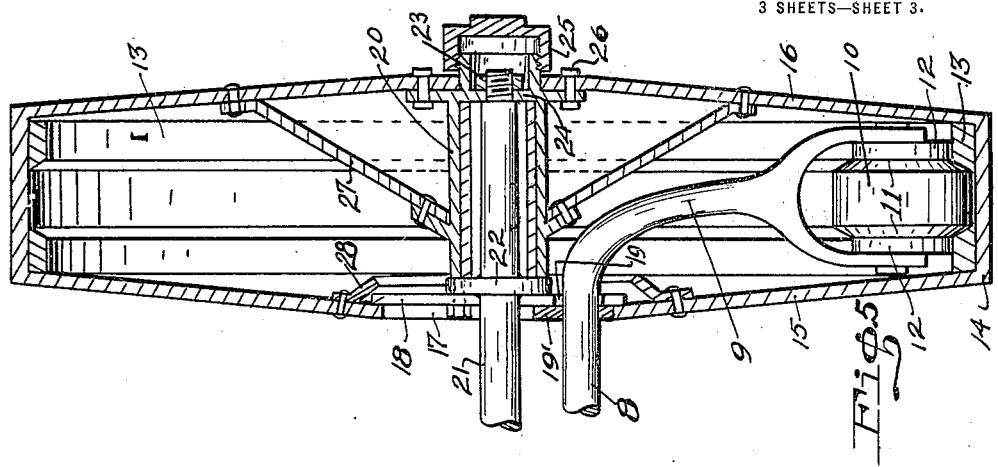
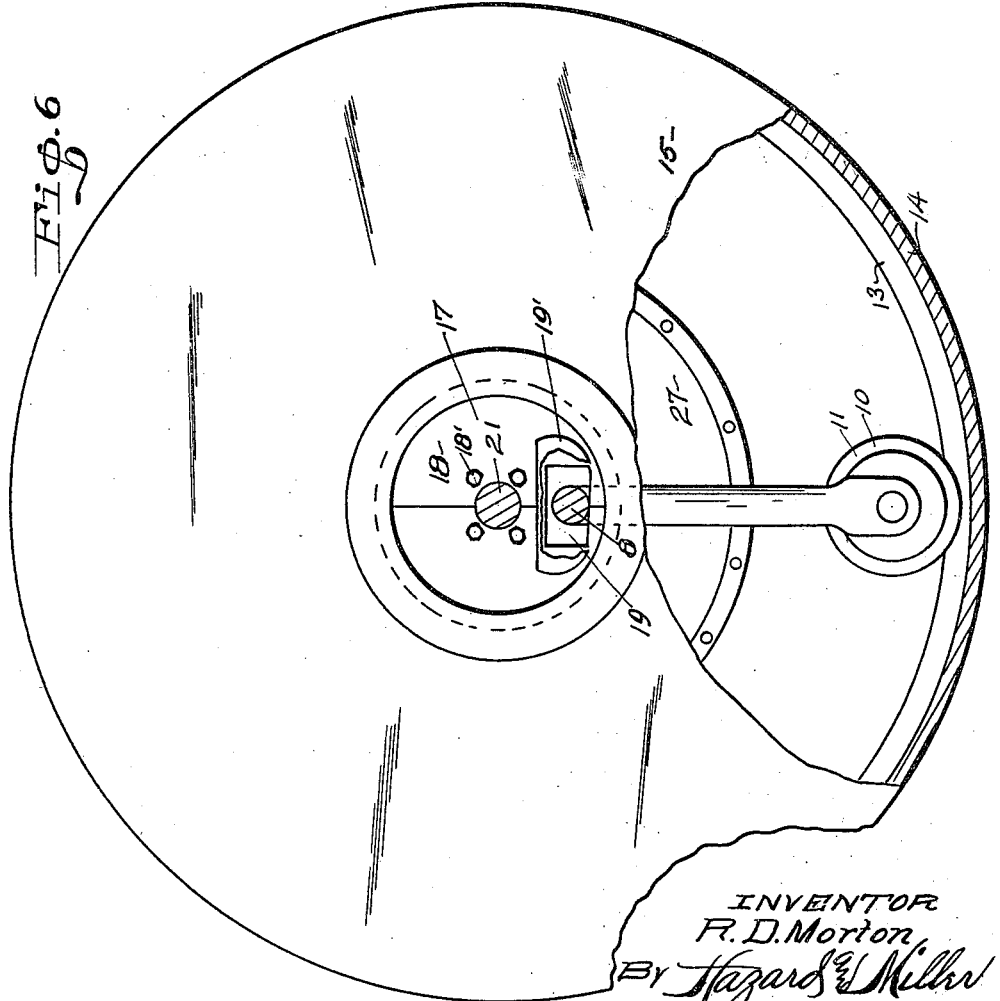
INVENTOR
R. D. Morton
By Hazard & Miller
ATT'YS

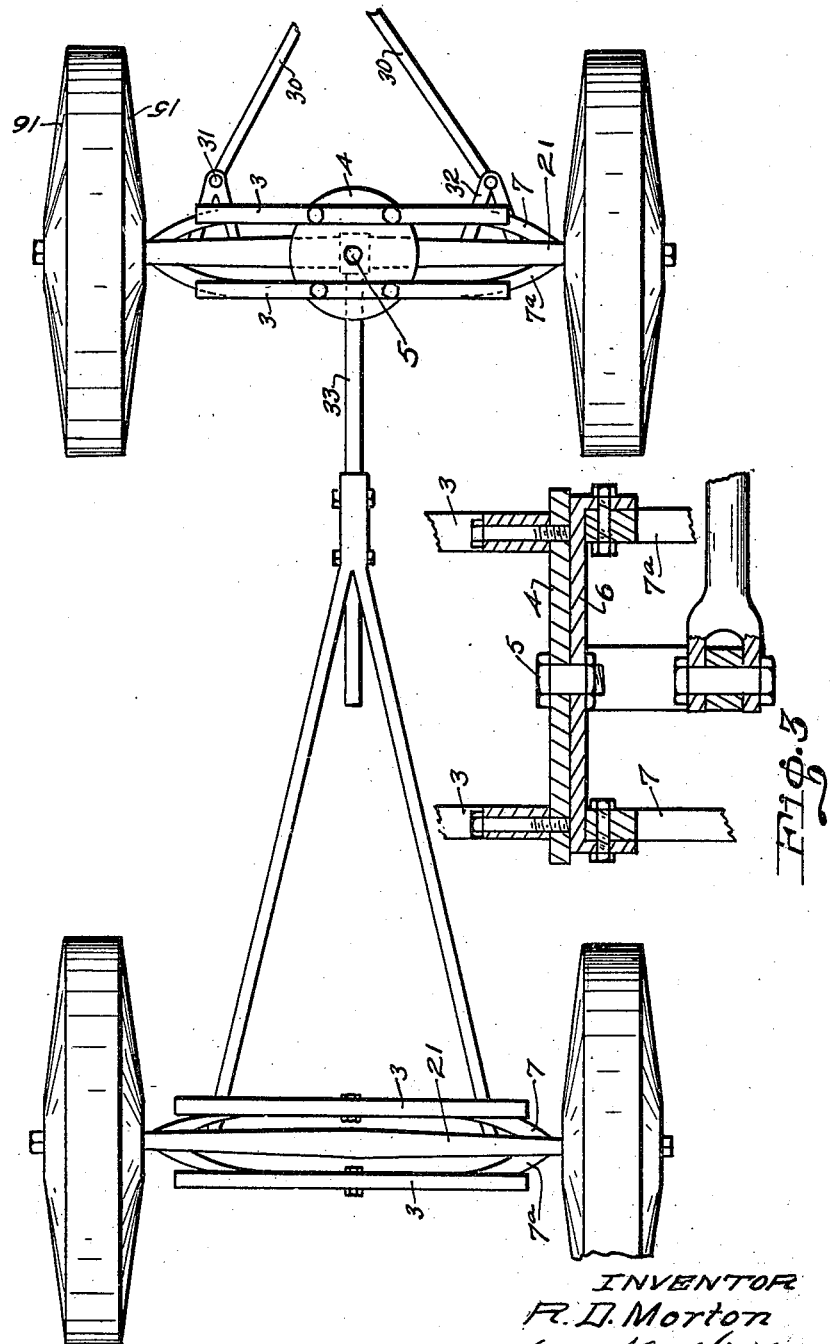

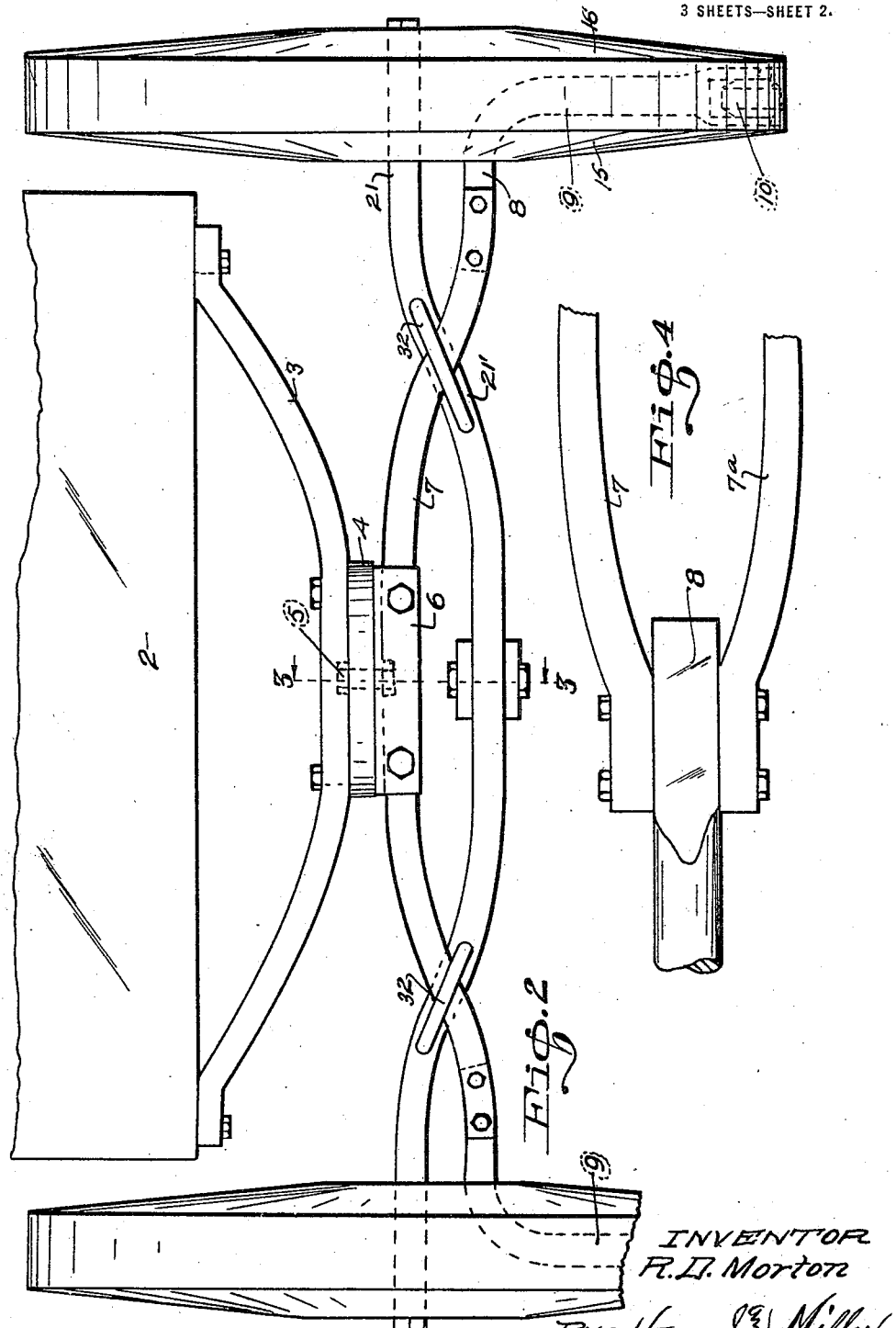

UNITED STATES PATENT OFFICE.

RICHARD D. MORTON, OF COMPTON, CALIFORNIA.

RUNNING-GEAR FOR VEHICLES.

1,375,311. Specification of Letters Patent. Patented Apr. 19, 1921.

Application filed December 23, 1919. Serial No. 346,961.

*To all whom it may concern:*

Be it known that I, RICHARD D. MORTON, a citizen of the United States, residing at Compton, in the county of Los Angeles and State of California, have invented new and useful Improvements in Running-Gears for Vehicles, of which the following is a specification.

This invention relates to vehicles and more particulary to a novel means of constructing the running gear for them, wherein the draft wheels are interconnected by the usual axle and reach rod, the load of the vehicle being borne by separate and distinct axles, extending substantially parallel with the draft axle, and being supported on load bearing wheels or rollers operating on the inner face of the draft wheel treads; the principal object of the invention being to distribute the load of the vehicle as near as possible to the traction surface of the wheel, without the necessity of constructing the wheel with the usual intervening load bearing spokes.

A further object of the invention consists in the novel construction, combination and arrangement of details, the embodiment of which is illustrated in the accompanying drawing, in which:—

Figure 1 is a plan view of the running gear.

Fig. 2 is a front end view of the same, one of the wheels being partly broken away.

Fig. 3 is a section on line 3—3 of Fig. 2.

Fig. 4 is a top plan view of the left-hand end portion of the loaded axle.

Fig. 5 is a vertical, central section through one of the improved traction wheels and drivers.

Fig. 6 is a side elevation partly broken away of the structure of Fig. 5.

The present improvement is designed to transmit the load on the running gear, as for instance the vehicle body 2 and its cargo, down to points in close proximity to the ground and yet to provide draft gear with wheels of comparatively large or usual diameter, and this object is attained in the present case in the following manner:

The body of the vehicle is provided at each end with transverse bolsters 3—3 the forward of which is shown in Fig. 2 as provided with a disk or plate 4 through which passes a king bolt 5 passing through a saddle or lower plate 6, Figs. 2 and 3, the front and rear portions of which are supported on substantially parallel transverse and rigidly connected axle forming members 7 and 7ª, Figs. 1 and 3, these being bent toward each other at the opposite ends and securely fastened to the upper inwardly directed axle arm 8 of which there is one at each end of the transverse axle structure 7ª, these arms being bent vertically downwardly as clearly shown in Figs. 2 and 5 at 9, and the lower ends of these arms 9 are shown as provided with rollers 10.

These rollers are preferably provided with outwardly convergent side beveled faces 11 and hub portions 12, these faces and the peripheral surfaces of the hubs 12 being designed to bear upon a set of spaced annular tracking rings 13 that are shown, in Fig. 5, as secured or formed on the inner face of a tread rim 14 forming a part of the wheel-like structure having inner and outer side plates 15 and 16 respectively, the former being provided with a central aperture 17 that is covered on the inner face with a disk or cover plate 18 that has an eccentric aperture 19 to receive the adjacent portion of the axle arm 8 which bends down sharply just inside of the guard plate 18 which covers the aperture 17 that is of sufficient diameter to permit the wheel structure to rotate free of the eccentric axle part 8.

The disk or plate 18 forms a dust guard or cover to prevent the entrance of dust or other matter into the hollow wheel structure 15—16. The wheel is provided with a concentric bearing sleeve or housing 20 in which there is extended a concentric axle 21 with a flange or collar 22 adjacent the inner end of the bearing sleeve 20 and having on its outer end a nut 23 disposed just outside of a transverse collar 24 forming a part of or on the sleeve or hub 20.

The outer end of the shaft or axle 21 may be covered by a removable cap 25 threaded on a contiguous portion of the outside wheel plate 16 or other suitable part, in this case on the outer end of the sleeve 20. The sleeve is shown as riveted or bolted as at 26 to the central portion of the outer wheel plate or disk 16, although it may be connected in any other manner if desired, and it is also braced by a suitable bracing means as 27.

The chamber thus formed within the wheel structure 15—16 is designed to be charged with a suitable quantity of lubricant and the same is prevented from splashing or escaping through the openings 17 and 19 by an annular oil ring or guard 28 shown as secured to or formed on the inner face of the wheel plate 15 and surrounding the dust guard 18.

The front axle 21 extends transversely across the gear and is bent downwardly as at 21' and thence horizontally again centrally beneath the king bolt 5 and lies in a plane intermediate the side parallel members 7—7ª of the load axle and is not in any wise connected to the load axle so that none of the load of the vehicle is transmitted to the front axle 21 nor to the rear axle 21 which is of substantially the same construction and arrangement as is also the load bearing axle 8 and the rollers 10 and the rear wheels with the exception that the rear axle 21 has no pivotal connection with the bolsters 3 at the rear of the body.

Draft power to draw the vehicle is connected to the transverse and front draft axle 21 in any suitable manner, as for instance through draft links 30 that are in this case shown as divergently arranged and connected by bolts, pivots or other means 31 to the front ends of draft means or connectors 32, Fig. 1, extending from the front face of the load axle 21. The front axle is connected to the rear axle by suitable reach rod structure 33.

From the above it will be seen that the maximum pulling force of the draft means is exerted through the axles 21 and the reach rod 33 at the center of the large rotating power wheels 15, and these act as levers for constantly rolling the load that is transmitted well down toward the ground by means of the small wheels or rollers 10 of which there is one at each end of the front and rear load axles 7.

The dust guard 18 is shown as in sections to facilitate its being assembled about the eccentric axle 8 and is bolted or otherwise fastened at 18' to the collar 22 on the axle 21 and therefore is stationary while the plate 15 rotates as to the guard 18. The small elongated opening 19 through which the axle 8 passes may be covered by a supplemental dust guard 19'.

Various changes may be made without departing from the spirit of my invention as claimed.

I claim:

1. In a draft gear for wheeled vehicles, a circular wheel having an annular rim member and side plates attached thereto forming a substantially closed chamber with an axle opening at one side; an axle bearing concentrically mounted in the wheel; and an eccentric axle passing through the axle opening and having a downwardly turned arm with antifriction means rolling upon the lowermost portion of the said rim.

2. In a draft gear for wheeled vehicles, a circular wheel having an annular rim member and side plates attached thereto forming a substantially closed chamber with an axle opening at one side; an axle bearing concentrically mounted in the wheel; an eccentric axle passing through the axle opening and having a downwardly turned arm with antifriction means rolling upon the lowermost portion of the said rim; and a dust guard for the axle opening.

In testimony whereof I have signed my name to this specification.

RICHARD D. MORTON.